This invention relates to a process for conveniently producing substantially colorless polyesters whose content of foreign matter is small, using a novel ester-interchange catalyst having a catalytic activity not differing substantially from the conventional ester-interchange catalysts. More specifically, the invention relates to a process for producing polyesters which will provide substantially colorless and transparent films whose cleavage is small and which are suitable for use as photographic films.

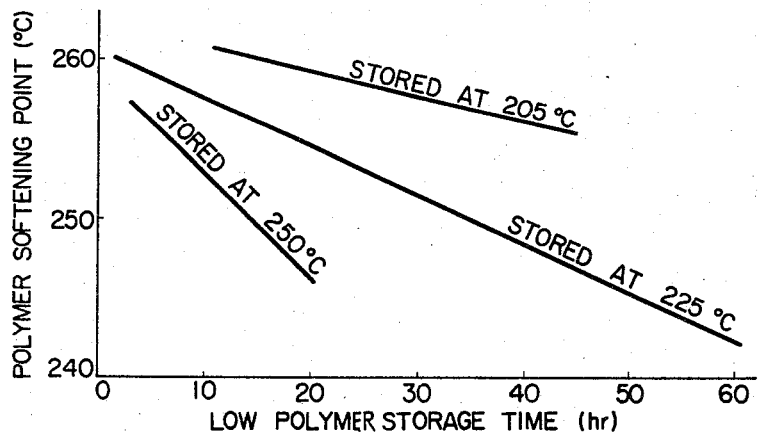
RELATIONSHIP BETWEEN LOW POLYMER STORAGE TIME
AND SOFTENING POINT OF POLYMER
INVENTORS
REI YOKOUCHI
YOSHIMITSU ICHIKAWA
ETSURO HOSOI
TOSHIKAZU AOKI
KENJI TAKAGISHI
BY
ATTORNEY 3,376,265
PROCESS FOR PRODUCING POLYESTERS
Rei Yokouchi, Yoshimitsu Ichikawa, Etsuro Hosoi, Toshikazu Aoki, and Kenji Takagishi, Mishima-shi, Shizuoka-ken, Japan, assignors to Toyo Rayon Kabushiki Kaisha, Tokyo, Japan, a corporation of Japan
Filed Oct. 15, 1963, Ser. No. 318,478
Claims priority, application Japan, Oct. 19, 1962, 37/46,312; Sept. 7, 1963, 38/46,782
1 Claim. (Cl. 260—75)

The polyesters presently being produced, for example, in the case of polyethylene terephthalate, is obtained generally by an operation consisting of a first-stage reaction in which an ester-interchange reaction is carried out by heating dimethylterephthalate and ethylene glycol to 150–260° C. while removing the methanol formed followed by a second-stage reaction in which the polymerization is carried out by heating the foregoing ester-interchange product to a temperature of 260–290° C. while in the meantime removing the ethylene glycol formed. In this case it is known that it is an absolute necessity that a catalyst be used to ensure that the first- and second-stage reactions proceed smoothly and also to obtain the polyester economically. Further, it is known that the catalyst used influences greatly the color tone and content of foreign matter of the polyester obtained.

As a result of our assiduous researches for a catalyst which would satisfy the various points mentioned above, we found that by using magnesium chloride as the catalyst is was possible to produce commercially with advantage polyesters which are substantially colorless and of superior transparency and whose content of foreign matter is small.

Further, when studies were made with the intention of utilizing this process for producing polyesters for use as photographic films, we found that in the case of polyesters for use as photographic films even the presence of minute dispersions which give desirable effects in the enhancement of the elongation in the case of polyesters used for obtaining fibers, not to mention the coarser foreign matter, impart a stain to the resulting film so as to impair its transparency which is of vital importance in the case of a photographic film, and hence that it is impossible to obtain a substantially colorless polyester film with the compounds conventionally known, such as those of zinc, manganese, cobalt and titanium. It was found however that this could be favorably improved upon by using magnesium chloride as the catalyst during the ester-interchange reaction.

It is known however that another troublesome problem exists in case of a polyester film, i.e., its cleavage. Although this property was the cause of a considerable amount of trouble during the perforation step in the production of photographic films, hardly any attention was paid heretofore to researches for improving on this property. That is to say, this type of demand being eclipsed by the essential demand to obtain polyester films having only good transparency and containing little foreign matter had not yet reached the point of its being investigated.

With the objective of favorably changing the cleavage of the polyester films which had been improved greatly in their color tone and foreign matter content by means of the process in which magnesium chloride is used as the ester-interchange catalyst, we made numerous further studies, with the consequence that an entirely novel discovery was made; namely, that the cleavage of polyester film could be changed by adjusting its purity, i.e., its softening point. Namely it was found that the cleavage could be reduced in producing polyesters from derivatives of terephthalic acid and ethylene glycol by effecting said reaction in the presence of magnesium chloride in an amount preferably in particular of 0.01–0.3% by weight based on the derivative of terephthalic acid and reducing the softening point of the polyester somewhat, i.e., by making the softening point range between 259 and 230° C.

What is referred to herein as the derivatives of terephthalic acid are the mono- or diesters of terephthalic acid of alkanols having 1–4 carbon atoms.

According to the process of this invention, magnesium chloride is used as the ester-interchange catalyst which is used in an amount of 0.01–0.3% by weight and preferably 0.05–0.2% by weight, based on the terephthalic acid derivative. Further, by operating such that the softening point of this substantially colorless polyester excelling in transparency whose content of foreign matter is small ranges between 259 and 230° C. surprisingly a polyester can be produced from which can be obtained a film whose cleavage is small and hence suitable for photographic purposes.

As is clear from the example, the addition of the magnesium chloride, used as the catalyst in this invention, in amounts of 0.01% by weight or less, based on the terephthalic acid derivative, is insufficient. When the magnesium chloride is used in amounts of 0.01% by weight or less, the rate at which the reaction proceeds is retarded extremely so that the number of hours required for accomplishing the ester-interchange reaction is greatly prolonged. Thus, it is economically a disadvantage. Hence, in this case, it would become necessary to make joint use of another ester-interchange catalyst, with the consequence that it would be unfavorable for achieving the objects of this invention. If the amount added of the magnesium chloride is increased, the rate at which the ester-interchange reaction proceeds increases, but as the amount added increases, the proportional increase in the reaction rates decreases to a point where no increase in the rate of reaction can be observed by addition of more than 0.3% by weight of magnesium chloride, based on the terephthalic acid derivative. Instead, there is observed a deterioration in the color tone of the polymer obtained and an increase in its content of coarse foreign matter.

Further, even though the amount added of the magnesium chloride is from 0.01 to 0.3% by weight, in those cases when conjoint use of other ester-interchange catalyst has been made, such as, for example, manganese acetate, cobalt acetate, lead acetate and calcium acetate, the transparency of the resulting polyester film is generally low and there is seen a tendency to an increase in the content of foreign matter.

Consequently, the magnesium chloride, as a catalyst, is most suitably used alone in this invention without being combined with the other known ester-interchange catalyst in an amount, based on the terephthalic acid derivative, of 0.01–0.3% by weight, and preferably 0.05–0.2% by weight.

In this instance, by making the softening point less than 259° C. an improvement to a considerably desirable extent in the cleavage can be obtained. On the other hand, if the softening point is made less than 230° C., an increase in the stickiness between the rolls and film takes place during the casting of the film to result in the appearance of undesirable irregularities in the film surface. Hence, preferably the softening point is above 230° C. according to this invention.

According to the process of this invention, in order to make the softening point of the polyesters less than 259° C., the following methods are conveniently carried out; namely, a method of incorporating another copolymerizable component besides the derivative of terephthalic acid and ethylene glycol, a method of incorporating a compound having a sulfate or sulphonic radical which promotes the formation of ether bonds in the polyester and as a result lower the softening point, or a method of effecting the polymerization of the polyester under conditions as will bring about the autogenous formation of ether bonds of such as ethylene glycol in the reaction system.

As the foregoing copolymerizable component can be mentioned, in the first place, as the dibasic acids the aliphatic dicarboxylic acids such as carbonic acid, oxalic acid, adipic acid, azelaic acid and sebacic acid; the aromatic dicarboxylic acids such as terephthalic acid, isophthalic acid, phthalic acid, 2,6-naphthalene dicarboxylic acid and diphenic acid, the alicyclic dicarboxylic acids such as 1,2-cyclopentane dicarboxylic acid; the other dicarboxylic acids having elements other than carbon, hydrogen and oxygen, for example, a compound represented by the sulfur or nitrogen containing structural formula

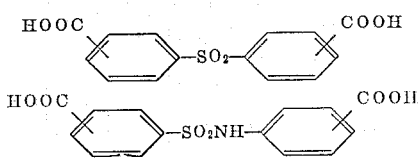

such as 5-sodium sulfoisophthalic acid and 5-methyl sulfoisophthalic acid or the polyfunctional compounds such as trimellitic acid and pyromellitic acid. On the other hand, as the dihydroxy component included are the polyhydroxy compounds such as, for example, ethylene glycol, diethylene glycol, butanediol, thioglycol, p-xylylene glycol, 1,4-cyclohexane dimethanol, 2,2-bis(p-oxyphenyl) propane, 2,2-bis(p-oxyethoxyphenyl) propane and, besides these, glycerine and pentaerythritol.

Further, as the oxycarboxylic acids can be named such as p-oxyethoxybenzoic acid, vanillic acid, p-oxyethoxy-m-chlorobenzoic acid, p-oxymethylbenzoic acid, glycolic acid, etc.

That the melting points of the random polymers obtained by the incorporation of these copolymeric components can be applied to the following equation of Flory is well-known.

$$(1/Tm) - (1/Tm°) = (-R/Hu)^{\ln XA}$$

wherein $Tm°$ $(=265)$, $Tm$ is the melting points of polyethylene terephthalate and the copolymers, $Hu$ is the heat of fusion per recurring unit of the polyethylene terephthalate (about 2600 calories) $XA$ is the molar rate of the polyethylene terephthalate component and $R$ is the gas constant.

Hence, for lowering the melting point of below 259° C. it is necessary to add more than 4–5 mol percent of the copolymerizable components.

In order to make the melting points of the polyesters obtained according to this invention fall within the range 259–230° C., while this may be accomplished by using the two components of a lower aliphatic ester of terephthalic acid and ethylene glycol and adjusting the reaction conditions suitably, it may also be accomplished by incorporating a third copolymerizable component in the reaction system and effecting the copolymerization thereof.

In this instance, if as the third component is selected a substance capable of forming a random polymer, it would be convenient as it would then be possible to estimate the approximate amount thereof to be suitably added from Flory's equation, as described above. It is to be understood, however, that the present invention is not to be limited to the use of a third component capable of forming a random polymer and that so long as the melting point of the polyester obtained can be made to fall within the range 259–230° C., the third component may be one which block copolymerizes and moreover its form is not critical. Needless to say, a branching agent or the like may also be added in this instance.

The polyethylene terephthalate produced from dimethyl terephthalate and ethylene glycol generally has a melting point 260–262° C., however, and while it is considerably lower than that of pure polyethylene terephthalate, this is known to be due to diethylene glycol and the minute amount of other impurities which are formed by the condensation between ethylene glycol itself during the polymerization reaction. Accordingly, when, as in this invention, the starting materials are the derivatives of terephthalic acid and ethylene glycol, more than 1–2 mol percent of the copolymerizable component is conveniently added for obtaining a polyethylene terephthalate having a softening point ranging between 259° and 230° C.

While the copolymerizable component may be added either during the ester-interchange reaction or during the polymerization reaction, preferably the addition is made during the former. Particularly, in the case of those such as diethylene glycol and propylene glycol which are distilled off to the outside of the system under polymerization conditions of such as a temperature of 260–290° C. and pressures of less than 1 mm. Hg, the addition should be made during the ester-interchange reaction.

Since, in general, when a dihydroxy compound is used as the copolymeric component, the regulation of the amount of its addition is difficult owing to some of it being distilled off to the outside of the system even when added during the ester-interchange reaction, a carboxylic acid is preferably used as the copolymeric component according to this invention.

Further, while sulfuric acid and benzenesulfonic acid are preferably used as the compound having such as a sulfate or sulphonate radical for promoting the formation of ether bonds in the polyesters, these should be added to the system during the ester-interchange reaction. The effects of the sulfate and sulphonate radicals that are had in lowering the softening point of polyethylene terephthalate are about equal. In the case of the sulfate radical, generally there is the relation $y=261-9.1\times10^2 x \pm 1$, wherein $y$ is the softening point in degrees centigrade and $x$ is the mol percent of the sulfate radical. Hence, in order to make the softening point less than 259° C., the addition of $2.2\times10^{-3}$ mol percent will do.

On the other hand, for causing the autogenous formation of ether bonds in the reaction system there is, for example, such as either a method of temporarily interrupting the reaction from proceeding at an intervenient point in the reaction and storing the low polymer or polymer, or a method of storing the polyester in its molten state after completion of the polymerization.

In this case, the deterioration of the properties of the polyester other than the softening point, particularly its color tone, is undesirable for the quality of the product. As this deterioration in the color tone is more pronounced as the degree of polymerization becomes higher, this storage is preferably carried with low polymers.

The accompanying drawing FIG. 1 is a graph showing the relationship between the storage time and the lowering of the softening point of the polymer obtained when, as one mode of practicing the present invention, a low polymer is stored. Since, as is apparent from FIG. 1, the effects of the storage time show quite a variation in accordance with the storage temperature, it is desired that a suitable temperature be determined and the time be adjusted accordingly. Generally, the procedure in which the polymer is held subsequent to the ester-interchange reaction at the temperature at which the reaction was completed is simple in operation. The time to be held at this temperature can be obtained for the intended softening point from FIG. 1.

As hereinbefore described, it is possible, according to the process of this invention, to produce easily polyesters which will provide polyester films which are substantially colorless and excel in transparency and in which the content of foreign matter is small and whose cleavage has been improved.

The following examples are given for the purpose of illustrating the invention; however, the invention is not to be limited to these examples. Parts and percentages are by weight unless otherwise indicated.

Example 1 and Controls 1–8

To 100 parts of dimethyl terephthalate and 64 parts of ethylene glycol was added 0.05 part of a catalyst, following which an ester-interchange reaction was carried out for 2 hours at 195° C. In the following Table I are shown the results obtained when magnesium chloride was used as the catalyst and likewise when other catalysts were used (Controls 1–8).

TABLE I

| Catalyst | | Ester-Interchange Reaction Rate, Percent | Color Tone | Foreign Matter Visible to the Naked Eye |
|---|---|---|---|---|
| Control 1 | Magnesium oxide | 73.1 | Colorless | Brown foreign matter present. |
| Example 1 | Magnesium chloride | 72.0 | do | None. |
| Control 2 | Basic magnesium carbonate | 65.1 | do | Do. |
| Control 3 | Magnesium acetate | 61.2 | do | Do. |
| Control 4 | Magnesium glycol oxide | 55.3 | do | Do. |
| Control 5 | Magnesium nitrate | 47.6 | Yellow | Do. |
| Control 6 | Ammonium magnesium chloride | 21.3 | Colorless | Do. |
| Control 7 | Magnesium sulfate | 0 | Yellow | Great amount present. |
| Control 8 | Magnesium hypophosphite | 0 | Colorless | Present. |

From the results shown in Table I it is apparent that according to this invention the reaction can be carried out at an ester-interchange reaction rate comparable to that by means of magnesium oxide and at the same time the polyester obtained is not only colorless but does not contain discernible foreign matter as well. In contrast, it can be seen that it is not possible to produce polyesters capable of satisfying simultaneously the points of reaction rate, color tone and foreign matter content by the use of the catalysts shown in Controls 1–8.

Example 2

100 parts of dimethyl terephthalate, 70 parts of ethylene glycol and 0.09 part of magnesium chloride were reacted for 4 hours at 150–230° C. to complete the ester-interchange reaction. To this were added 0.03 part of antimony oxide and 0.06 part of triethyl phosphate, which was then heated for 4 hours at 275° C. under a vacuum of below 1 mm. Hg. The intrinsic viscosity of the resulting polymer measured in a phenol-tetrachloroethane (6:4) mixed solvent at 25° C. was 0.65, its softening point was 261° C. and its color tone was colorless.

When the foreign matter of larger than 20 microns contained in 10 grams of this polymer was determined with a 60-power binocular microscope, only five could be counted.

Control 9

The polymer obtained by following the same procedures as described in Example 2, excepting that instead of the magnesium chloride 0.09 part of magnesium oxide was used had an intrinsic viscosity of 0.66, a softening point of 260.8° C. and it was very light yellow in color. The foreign matter count determined as in Example 2 was 21.

When the results of the foregoing Example 2 and Control 9 are compared, it can be seen that the polyester obtained according to this invention is far superior in both its color tone and foreign matter content.

Example 3

Besides 100 parts of dimethyl terephthalate and 71 parts of ethylene glycol 9.1 parts of diglycol ester of adipic acid was used as the copolymerizable third component, and with 0.09 part of magnesium chloride as the catalyst the ester-interchange reaction of these was carried out for 4.5 hours at 150–235° C. in a stainless steel reactor equipped with a rectification column and an agitator. Then, after adding 0.05 part of antimony acetate and 0.03 part of phosphorus acid, the polymerization reaction was carried out for 4 hours at 275° C. under a vacuum of below 1 mm. Hg.

The polymer obtained was colorless, and when determinations were made as in Example 2, its intrinsic viscosity was 0.65, softening point was 241.0° C. and foreign matter count was 4.

When this polyester was made into a 100-micron-thick film, its degree of turbidity was 0.50% and no cleavage at all was observed.

Example 4

The same procedures as described in Example 3 were followed in carrying out the ester-interchange and polymerization reactions, except that instead of the 9.1 parts of diglycol ester of adipic acid sulfuric acid was added in an amount as to yield 50 parts per million of sulfate radicals. The so obtained polyester was colorless, and when measured as described in Example 2, its intrinsic viscosity was 0.64, softening point was 255° C. and foreign matter count was 6.

When this polyester was cast into a film 100 microns in thickness, its degree of turbidity was 0.53%, and its cleavage was also improved.

Example 5

To 100 parts of dimethyl terephthalate and 71 parts of ethylene glycol was added magnesium chloride in varying amounts (Nos. 1–8), after which the ester-interchange reactions were carried out at 150–230° C. while distilling off methanol. Then, after raising the temperature to 250° C., at which temperature the mixture was maintained for 3 hours under a reduced pressure of 100 mm. Hg. 0.08 part of triphenyl phosphate and 0.03 part of antimony oxide were added, following which the temperature was raised to 275° C. and the polymerization reaction was carried out at this temperature for 4.5 hours under a vacuum of below 1 mm. Hg while distilling off ethylene glycol in the meantime. The ester-interchange reaction time and the properties of the polymers obtained were as follows:

rying out the polymerization in the presence of a catalyst consisting of magnesium chloride in an amount of 0.05–0.2% by weight based on said mono- and di-esters of terephthalic acid.

TABLE II

| No. | Amount Added of Magnesium Chloride, Percent | Ester-Interchange Reaction Time, hr. | Intrinsic Viscosity | Softening Point, °C. | Color Tone | Foreign Matter Count | Degree of Turbidity, Percent | Cleavage |
|---|---|---|---|---|---|---|---|---|
| 1 | 0.005 | 30 | (¹) | | | | | |
| 2 | 0.008 | 16 | 0.513 | 255.0 | Light yellow | 4 | 0.55 | Improved. |
| 3 | 0.012 | 10 | 0.655 | 257.1 | Colorless | 5 | 0.53 | Do. |
| 4 | 0.05 | 6 | 0.669 | 257.3 | ___do___ | 5 | 0.57 | Do. |
| 5 | 0.10 | 4.1 | 0.647 | 257.2 | ___do___ | 5 | 0.55 | Do. |
| 6 | 0.20 | 3.8 | 0.672 | 256.8 | ___do___ | 6 | 0.60 | Do. |
| 7 | 0.30 | 3.5 | 0.672 | 258.0 | Negligible coloration. | 8 | 0.65 | Do. |
| 8 | 0.50 | 3.6 | 0.666 | 257.1 | Light yellow | 19 | 0.82 | Do. |

¹ Polymerizing impossible.

From the foregoing results it is seen that the addition of the magnesium chloride is preferably of the order of 0.01–0.3% by weight.

We claim:

1. In a process for producing polyesters having a softening point between 209° C. and 230° C. from the mono- and di-esters of terephthalic acid of alkanols having 1–4 carbon atoms and ethylene glycol by means of an ester interchange and polymerization reaction, the improvement which comprises (1) employing an ester interchange catalyst consisting of antimony oxide and (2) carrying out the polymerization in the presence of a catalyst consisting of magnesium chloride in an amount of 0.05–0.2% by weight based on said mono- and di-esters of terephthalic acid.

References Cited

UNITED STATES PATENTS

| | | | |
|---|---|---|---|
| 3,050,533 | 8/1962 | Munro et al. | 260—75 |
| 3,055,868 | 9/1962 | McIntyre et al. | 260—75 |
| 3,055,869 | 9/1962 | Wilson et al. | 260—75 |
| 2,249,950 | 7/1941 | Fuller | 260—75 |
| 2,921,051 | 1/1960 | Amborski et al. | 260—75 |
| 3,070,575 | 12/1962 | Cramer | 260—75 |

WILLIAM H. SHORT, *Primary Examiner.*

L. P. QUAST, *Assistant Examiner.*